Oct. 11, 1955     H. VON SCHERTEL     2,720,180
HYDROFOIL SYSTEM FOR WATER CRAFT

Filed Oct. 7, 1952     2 Sheets-Sheet 1

INVENTOR.
Hanns Von Schertel
BY Michael S. Striker
agt.

Oct. 11, 1955 H. VON SCHERTEL 2,720,180
HYDROFOIL SYSTEM FOR WATER CRAFT
Filed Oct. 7, 1952 2 Sheets-Sheet 2

INVENTOR.
Hanns Von Schertel
BY
Michael S. Striker
agt.

United States Patent Office 2,720,180
Patented Oct. 11, 1955

2,720,180

HYDROFOIL SYSTEM FOR WATER CRAFT

Hanns von Schertel, Wiesbaden, Germany, assignor to Supramar A. G., Zug, Switzerland Application October 7, 1952, Serial No. 313,404

Claims priority, application Switzerland October 12, 1951

21 Claims. (Cl. 114—66.5)

My present invention relates to improvements in watercraft hydrofoils adapted to raise the hull partly or entirely above the water level.

In order to meet all the requirements demanded of such craft in operation, the angle of attack of the foils has to be adjustable, at least when the craft is standing still, and in the case of craft having comparatively large loading and speed ranges, such adjustability also is desirable in passage. When navigating in shallow waters, the foils have to be retractable in passage on account of the great draft at small speeds inherent to any hydrofoil system. For control and service purposes, the foils have to be readily exchangeable and so constructed as to be swingable upwardly above the water level. Finally, moreover, manufacturing aspects have to be taken into account in the construction of the foils.

All these requirements have not been satisfactorily fulfilled by the hydrofoil systems known so far, as these foils generally have been directly connected to the static hull structure or parts of the hull in a static respect formed a component of the foil system.

My present invention is distinguished by the fact that each foil, in combination with its struts and a stiff girder, forms a statically self-contained frame work capable of taking up the moments. The position of said frame is variable with respect to the hull of which no part forms a component of the hydrofoil system. The frame itself may be so formed that the lift-producing fin portions rigidly connected to the girder on both sides link the rigid girder with the foils and gradually merge from the girder profile into the foil profile. The struts and fins may have a common juncture on the girder, the said parts being interconnected through flanges. The frame, further, may be suspended in the girder axis or in an axis adjacent thereto, which is movable vertically in guide elements fixed to the hull and swingable forwardly and rearwardly, whilst spaced vertically from said axis guides are provided which take up the moments about the said swing axis and which are instrumental in keeping the foil system substantially parallel when moving the same.

By virtue of the statically self-contained foil frame being vertically movable and, when loaded, not transmitting any internal forces or to the guiding elements, spring means may be inserted between the foils and the hull in a very simple way and manner, which means counteract the lifting force and sag when the foils are struck by waves. The foil sets may be extended and retracted and the hull be raised from or lowered into the water level in passage at full load by simple means such as oil-pressure cylinders without varying the lifting effect or diving depth of the foils and without giving origin to great forces such as has been the case in the arrangements proposed so far which comprise joints on the foils and which are retractable. In this way the prerequisites for navigating shallow waters are fulfilled in which the draft cannot be exceeded even temporarily.

Various forms of the invention are illustrated by way of example in the accompanying drawings, in which.

Figure 1A:
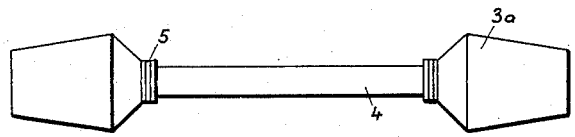
Fig. 1a is a top plan view of a finned girder.
Figure 1:
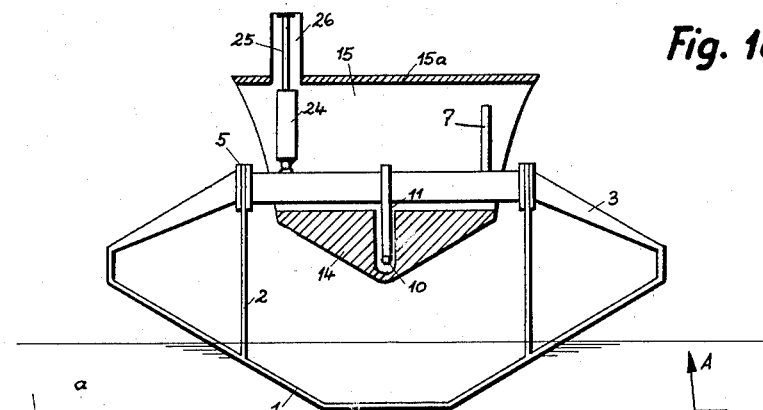
Fig. 1 is a front view of a fore foil set relative to the hull which is shown cut on the line a—a of Fig. 2, a guiding element being shown on one side and a retracting element on the other side of the drawing.
Figure 2:
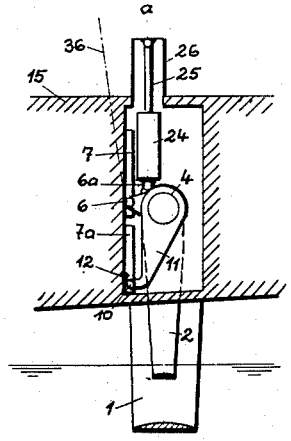
Fig. 2 is a side view partly in section of the device of Fig. 1.
Figure 4:
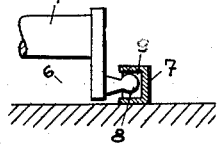
Fig. 4 is a view of the end of the central girder portion showing the guiding means in section.
Figure 8:
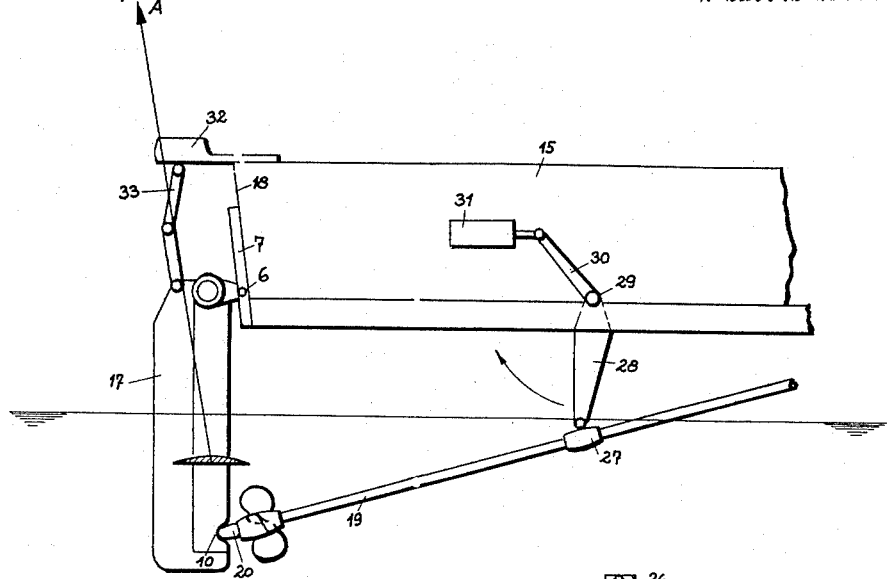
Figure 7:
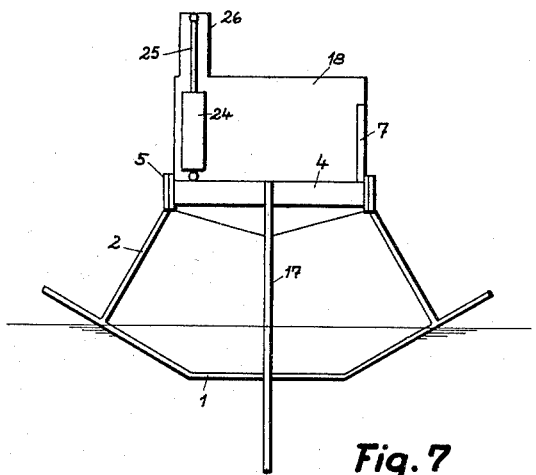
Figure 9:
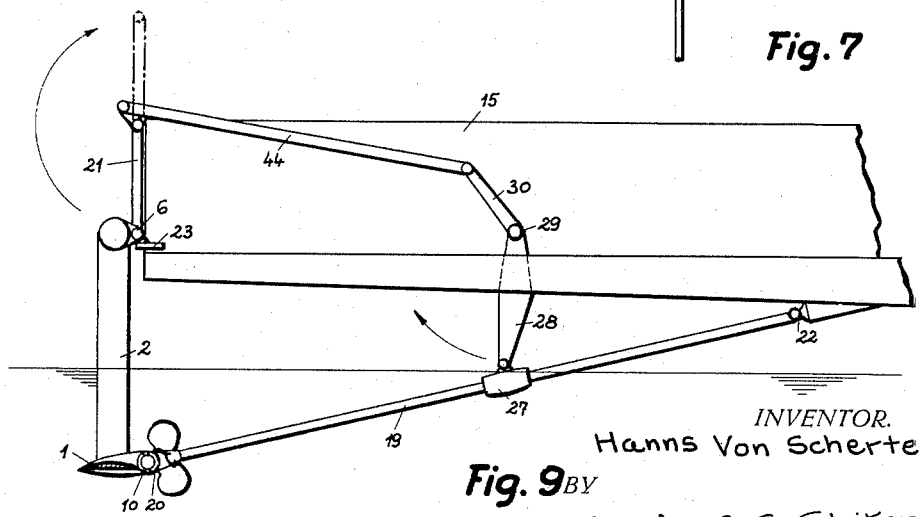

Fig. 7 is a rear view of an aft foil set relative to the hull, a guiding element being shown on one side and a retracting element on the other side of the drawing, Fig 8 is a side view of an aft foil set relative to the hull, there being shown only the rudder, the girder and the foil in section of the set, Fig. 9 a second form of Fig. 8 in side view, there being shown a strut, the girder and the foil in section of the set, and In Figs. 1, 1a and 2 there is shown the foil 1, struts 2 and the rigid tubular girder portion 4 having outer fin-like portions 3 extending from opposite ends thereof, the fin portions 3 being connected with the ends of foil 1 and the entire construction forming a complete framework. The central girder portion 4 has a somewhat circular cross-section which extends to the point 3a in the foil support profile of the fin-like support portions 3, the latter portions preferably being transversely inclined. As shown, the struts 2 and fins 3 advantageously have a common juncture on the girder 4. The three parts 2, 3 and 4 are provided with flanges 5 through which they are interconnected. The foil set may change its position relatively to the hull 15 and is suspended from the axis 6 (Fig. 2) which is adjacent to the girder axis. The said axis is vertically movable and pivotable in guide elements 7 which are fixed to the hull and in the present instance are formed as rails. In Fig. 1, the rail 7 is shown only on the right-hand side, since on the left-hand side it is masked by the operating elements shown there. From Fig. 4 may be seen that the suspension axis 6 preferably carries balls 8 which are mounted in sliding blocks 9 so that the axis may be moved and pivoted in the rails 7. In place of the sliding blocks, rollers may be provided. Spaced vertically from the suspension axis 6 there is provided, at the end of an arm 11, a second guideway 10 which also is movable in a rail 7a (Fig. 2) and which is instrumental for maintaining the foil set parallel when the same is moved. A portion of said rail is turnable in the axis 12 (Fig. 2) so as to bring about a change in the angle of attack of the foils.

Figure 3:
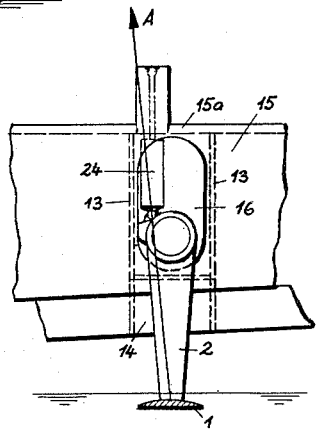
Fig. 3 is a side view of the device shown in Fig. 1, in which for the sake of clarity only a strut, the girder and the foil are shown.

The girder 4 of the fore set is, as shown in Fig. 3, suspended between the bulkheads 13 of the hull 15 above the rigid bottom portion 14 and below the deck portion 15a (hatched in Fig. 1) which takes up tensile and compressive forces, and is movable in slots 16 provided in the hull side-wall. The bulkheads 13 are secured to the bottom portion 14 in watertight relation so that the space between the bulkheads may be flooded. As shown, the foil set in its normal position is inclined to such a degree towards the vertical or, respectively, the suspension axis is disposed so far to the rear of the girder axis that the lifting force resultant A of the foil passes as closely as possible through the axis 6a so that no moment is produced about the latter and the guideway 10 is greatly relieved.

Figure 5:
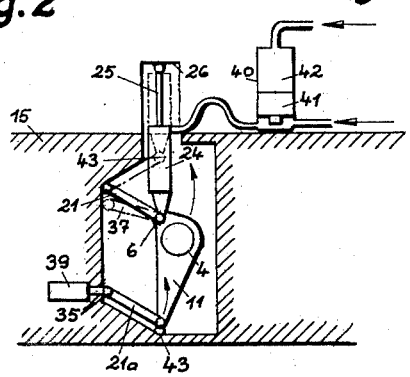
Fig. 5 is a side view of an embodiment of a retracting means according to the invention, in which for the sake of clarity only the supporting and mounting means of the foil framework are shown.

Fig. 5 shows a different embodiment of the mounting means for moving a foil framework. The axis 6 extends through link 21, which is swingably connected at its other end to the craft hull 15. Vertically spaced below the suspension axis 6 is a second guide element constituted by link 21a which is connected at the lower end of arm 11 which is mounted on supporting member 4, the link 21a providing for parallel positions of the foil framework during movement thereof, the end 35 of link 21a which is connected to the hull being horizontally movable in order to produce a change in the angle of attack of the foil.

In Figs. 7, 8 and 9, the aft foil 1 in combination with the struts 2, the rudder 17 and the tubular girder 4, forms a statically self-contained framework which is movably and pivotably suspended in the axis 6 rearwardly of the stern 18 of hull 15. The said frame work is movable in the rail 7, as in Fig. 1. The lower guideway is formed by the propeller shaft 19 which functions as a link. For such purpose, the shaft 19 comprises a fulcrum or swivel point 22 with a Cardan joint. Rearwardly of the propeller there is provided a bearing 20 which at 10 is articulated to the rudder 17 or wing 1 in Fig. 9 and adapted to take up the forces arising from the foil resistance. The foil set in such case is disposed vertically or inclined, negatively, at such a degree to the vertical or, respectively, the suspension axis 6 is disposed at such a distance in front of the girder axis, that the lift resultant A, as shown in the drawing Fig. 8, produces a rearwardly-turning moment which releases a rearwardly directed tractive force, thereby suitably diminishing the cross breaking force produced in the shaft by the propeller thrust. The stern 18 is inclined in direction of the circular arc described by the juncture 10 of the upwardly swinging shaft, in order to avoid greater changes in the angle of attack when retracting the foil set.

In Fig. 9 the guide element comprises a member 21 which on one hand is pivoted to the hull and, on the other hand, to the suspension axis 6. The second guide member is formed by the propeller shaft 19, as in Fig. 8, which here again is connected to the foil 1 through the bearing 20 and the joint 10 which are here joined in a spherical member and, on the other hand, is pivotable on a joint 22 to the hull. Such juncture of the member and the hull may be formed horizontally movable in order to attain a variation of the angle of attack of the foils. The propeller shaft 19 may be disposed in a tube and bent forwardly of the propeller with the aid of a Cardan joint or bevel gears. The member 21 stands vertical both in the lowermost and topmost positions and, thus, is capable of directly taking up the lifting forces. A locking device 23 may be provided which causes a change in the angle of attack while being horizontally movable.

The foils preferably are moved vertically through hydraulic cylinders 24 (Figs. 1, 2, 5 and 7) which suitably are secured to the girder 4, i. e. in the axis 6 or 6a, whilst the piston rod 25 engages the hull, for example through a cylindrical hollow body 26 fixed to the deck, into which body the cylinder 24 may move. Such an arrangement prevents dirt particles in the water from getting close to the piston rod when the craft is at standstill.

Since an increase in the lifting force is desirable during the retracting operation, the arrangement suitably is made such that the angle of attack of the hydrofoils is increased during retraction. This is attained by including, for example the upper guide rails 7 along line 36 in Fig. 2 and members 21 along line 37, (Fig. 5) relatively to each other. The aft foil framework can be retracted and extended at a greater speed than the fore foil framework by controlling the supply of fluid to the hydraulic cylinders in a corresponding manner, and in extension of the foil frameworks, the supply of fluid to the aft cylinder can be released when the piston of the fore cylinder has already moved over a portion of its path. In this way a stern heavy trim during retraction of the foil can be achieved, i. e., to bring about an increase in the angle of attack of the foil.

Figure 6:
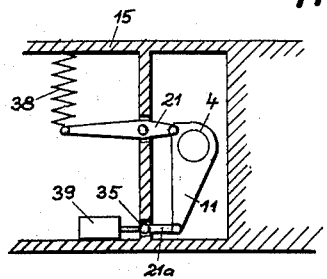
Fig. 6 is a side view of another embodiment of a retracting means according to the invention.

When the foil sets are sprung relatively to the hull for the purpose of attenuating wave surges, the hydraulic cylinders 24 are replaced by metallic, rubber or pneumatic spring means. Fig. 6 shows such an embodiment, in which the link member 21 is formed as a double-armed lever, and the spring element 38 is connected to the longer lever arm in order to reduce the necessary spring force. In this example, the end 35 of the lower link is made movable by hydraulic cylinder 39, in order to control the angle of attack of the foil. There also may be inserted a yieldable element, such as a pneumatic pad, into the oil circuit of the hydraulic cylinders which takes over the springing of the foils, without any necessity for changing the retraction system. Such an arrangement is shown in Fig. 5, in which a cylinder 40 having a free piston 41 is connected into the oil conduit of the retracting cylinder. The cylinder chamber 42 is under air pressure, so that piston 41 and along therewith the piston of cylinder 24 which is connected thereto by pressure fluid can act as a spring.

The foils, again, may be extended and retracted without inserting any servomotors, namely by the direct action of the water forces on the foils. In such case, as shown in Fig. 5, terminal-position locking means 43 are provided for the topmost and lowermost foil positions, the foils being retracted after having disengaged the said means, under a positive angle of attack through the lifting forces acting thereon, whilst for extension the foils are brought by moving the end 35 by means of mechanical or hydraulic adjusting elements 39 to an angle of attack at which the lift nearly disappears or acts in a negative sense. In such case, brake cylinders or friction brakes may be provided in the arrangement which delay the foil retraction and/or the speed of falling of the hull.

In Figs. 8 and 9, the propeller shaft has an intermediate prop 28 to which is pivoted a shaft bearing 27. The said prop may be rotated in the axis 29 in direction of the arrow when the aft foil is retracted. This is done, for example, in Fig. 8 by means of the hydraulic cylinder 31 which engages the arm 30 while the bearing 27 moves on the propeller shaft. In order to synchronize the movements of the prop 28 and the foil, a hydraulic cylinder 34 is connected to the foil framework and coupled to the cylinder 31 by conduits. Fig. 9 shows the mechanical coupling for movement of link 21 which includes actuating rods 44 connected to lever 30. The said two elements may be hydraulically or mechanically coupled while using suitable gear ratios.

In order to maintain the craft steerable during the entire foil retraction operation, a control gear 32 is mounted on the hull 15 above the rudder axis, as shown in Fig. 8, which gear is connected to the rudder by means of a longitudinally-movable torsion element 33. The latter may comprise spreader-like joints and may fold up during retraction, or consist of a splined shaft which moves in the gear.

The novel hydrofoil system described suitably satisfies all requirements as to adjustability and retractability during passage and serviceability according to the circumstances in which these requirements arise. Also the process of manufacturing the foils and their supporting and connecting parts is greatly simplified.

The self-contained foil unit may be series manufactured in jigs independently of the hull and without any work of adaptation. The foil sets may be quickly and simply installed and removed without any need for raising the craft out of the water. By virtue of the pivotability of the sets, the foils may be turned out on to the water level and cleaned, which operations only could be done on land or in a dock with the systems known so far. The suspension from a pivot axis permits to adapt the foils to the prevailing load condition or speed and to correct the hull deformations which are liable to arise in extended periods of operation and which bias the angle of attack of the foils.

Furthermore, the pivotability during passage permits to effectively slow down the craft in case of danger. The fore foil set may at once be brought to a smaller or negative angle of attack, for example, by conducting fluid under pressure into the hydraulic adjusting cylinder 39 in Figs. 5 and 6, whereby the hull is forced to dive while very pronounced resistances are set up.

What I claim is:

1. In a hydrofoil system for water craft, comprising, in combination, a hull; rigid supporting means extending transverse said hull and mounted thereon for movement between an upper and a lower position relative to said hull; and foil means connected to said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework.

2. In a hydrofoil system for water craft, comprising, in combination, a hull; rigid supporting means extending transverse said hull and mounted thereon for movement between an upper and a lower position relative to said hull, said rigid supporting means including a central girder portion, outer lift-producing fin portions and inner struts, said fin portions and said struts being connected to opposite ends of said central girder portion at common junction points; and foil means connected to said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework.

3. In a hydrofoil system for water craft, comprising, in combination, a hull; rigid supporting means extending transverse said hull and mounted thereon for movement between an upper and a lower position relative to said hull, said rigid supporting means including a central girder portion having flanges at opposite ends thereof, outer lift-producing fin portions and inner struts, said fin portions and said struts being connected to opposite ends of said central girder portion of said flanges; and foil means connected to said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework.

4. In a hydrofoil system for water craft, comprising, in combination, a hull; rigid supporting means extending transverse said hull, said rigid supporting means including a central girder portion, outer lift-producing fin portions and inner struts, said fin portions and said struts being connected to opposite ends of said central girder portion at common junction points; foil means connected to said fin portions and said struts of said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework; and means mounting said rigid supporting means on said hull for movement between an upper and a lower position relative to said hull in a suspension axis adjacent to the axis of said girder portion, said mounting means comprising rail means on said hull and a pair of vertically spaced pivotable shifting means connected to said rigid supporting means and vertically movable in said rail means, said rail means comprising upper and lower rail portions, at least one rail portion being inclinable about a horizontal axis for changing the angle of attack of said foil means.

5. In a hydrofoil system for water craft, comprising, in combination, a hull; rigid supporting means extending transverse said hull, said rigid supporting means including a central girder portion, outer lift-producing fin portions and inner struts, said fin portions and said struts being connected to opposite ends of said central girder portion at common junction points; foil means connected to said fin portions and said struts of said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework; and means mounting said rigid supporting means on said hull for movement between an upper and lower position relative to said hull in a suspension axis adjacent the axis of said central girder portion, said mounting means comprising a pair of upper and lower link means connected at one end to said rigid supporting means and at the other end to said hull, one of said link means being horizontally movable for changing the angle of attack of said foil means.

6. In a hydrofoil system for water craft, comprising, in combination, a hull; rigid supporting means extending transverse said hull, said rigid supporting means including a central girder portion, outer-lift producing fin portions and inner struts, said fin portions and said struts being connected to opposite ends of said central girder portion at common junction points; foil means connected to said fin portions and said struts of said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework; means mounting said rigid supporting means on said hull for movement between an upper and lower position relative to said hull in a suspension axis adjacent the axis of said central girder portion, said mounting means comprising a pair of upper and lower link means connected at one end to said rigid supporting means and at the other end to said hull, one of said link means being horizontally movable for changing the angle of attack of said foil means, said pair of link means in their uppermost and lowermost positions, respectively, being vertically spaced; and horizontally movable locking means for holding said pair of link means in said vertically spaced positions.

7. In a hydrofoil system for water craft, comprising, in combination, a hull; rigid supporting means extending transverse said hull, said rigid supporting means including a central girder portion, outer lift-producing fin portions and inner struts, said fin portions and said struts being connected to opposite ends of said central girder portion at common junction points; foil means connected to said fin portions and said struts of said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework; and means mounting said rigid supporting means on said hull for movement between an upper and lower position relative to said hull in a suspension axis adjacent the axis of said central girder portion, said mounting means comprising a pair of upper and lower link means connected at one end to said rigid supporting means and at the other end to said hull, one of said link means being horizontally movable for changing the angle of attack of said foil means, the lower link means being constituted by a propeller shaft pivotably mounted on said hull.

8. A device as defined in claim 4, wherein the foil means constitutes the aft foil and is movable rearwardly of the stern of the craft.

9. A device as defined in claim 5, wherein the foil means constitutes the aft foil and is movable rearwardly of the stern of the craft.

10. In a hydrofoil system for water craft, comprising, in combination, a hull having a deck, a bottom, sidewalls, and a pair of spaced bulkheads between said deck and said bottom, said sidewalls between said bulkheads being formed with vertical slots therein; rigid fore foil supporting means extending between said bulkheads and through said slots transverse said hull and mounted thereon for movement between an upper and a lower position relative to said hull, said rigid supporting means including a central girder portion, outer lift-producing fin portions and inner struts, said fin portions and said struts being connected to opposite ends of said central girder portion at common junction points; and fore foil means connected to said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework.

11. In a hydrofoil system for water craft, comprising, in combination, a hull; rigid aft foil supporting means extending transverse said hull, said rigid supporting means including a central girder portion, outer lift-producing fin portions and inner struts, said fin portions and said struts being connected to opposite ends of said central girder portion at common junction points; aft foil means connected to said fin portions and said struts of said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework; and means mounting said rigid supporting means on said hull for movement between an upper and lower position relative to said hull in a suspension axis adjacent the axis of said central girder portion, said mounting means comprising a pair of upper and lower link means connected at one end to said rigid supporting means and at the other end to said hull, one of said link means being horizontally movable for changing the angle of attack of said foil means, the lower link means being constituted by a propeller shaft pivotably mounted on said hull, the point of connection of said rigid support means to said hull being arranged so far in front of the lifting force resultant that the latter produces a rearwardly turning movement and a traction force in the propeller shaft.

12. In a hydrofoil system for water craft, comprising, in combination, a hull; rigid fore foil supporting means extending transverse said hull and mounted thereon for movement between an upper and a lower position relative to said hull, said rigid supporting means including a central girder portion, outer lift-producing fin portions and inner struts, said fin portions and said struts being connected to opposite ends of said central girder portion at common junction points; and fore foil means connected to said rigid supporting means and extending below the same transverse said hull, said foil means being movable with said rigid supporting means between an extended position below said hull and a retracted position closer to said hull than its extended position, said foil means together with said rigid supporting means forming a statically self-contained foil framework, the point of connection of said rigid supporting means to said hull being arranged so far to the rear of the axis of said central girder portion that the lifting force resultant passes through said point of connection.

13. A device as defined in claim 5 wherein resilient means are provided for counteracting the lifting forces of the foil means.

14. A device as defined in claim 5, wherein hydraulic means are provided for extending and retracting said foil framework, said hydraulic means comprising a cylinder mounted on said girder portion and a piston rod secured to said hull.

15. A device as defined in claim 14, wherein yieldable means are connected to said hydraulic means for enabling said foil means to sag.

16. A device as defined in claim 14, wherein fore and aft foil frameworks are provided, and means are provided for retracting and extending the aft foil framework at a higher rate and through a greater distance than the fore foil framework.

17. A device as defined in claim 4, wherein the upper and lower rail portions are inclined relative to each other to provide for increasing the angle of attack of said foil means on retraction thereof.

18. A device as defined in claim 5, wherein terminal-position locking means are provided for the uppermost and lowermost foil framework positions, the foil framework after said locking means are released being retractable at a positive angle of attack by the lifting forces acting thereon, and being extensible at an angle of attack at which lifting forces are absent.

19. A device as defined in claim 5, wherein said foil means is a fore foil and wherein hydraulic means are provided for instantaneously reducing the angle of attack of said fore foil to force the hull to immerse.

20. A device as defined in claim 5, wherein there is provided a rudder, a control means therefor, and a longitudinally adjustable torsion means connecting said rudder to said control means, said control means being mounted on said hull above said rudder.

21. A device as defined in claim 7, wherein said foil framework is an aft foil framework and wherein said device comprises an intermediate support member pivotably mounted at its upper end on said hull for turning about a pivot axis and connected at its lower end to said propeller shaft; and linkage means connected to said mounting means and said intermediate support member for turning the latter member about its pivot axis during retraction of said aft foil framework so that said propeller shaft simultaneously swings upwardly during said retraction.

References Cited in the file of this patent

UNITED STATES PATENTS

| 1,024,067 | Forlanini | Apr. 23, 1912 |
| 1,084,578 | Hewitt | Jan. 13, 1914 |
| 1,976,046 | Tietjens | Oct. 9, 1934 |
| 2,073,438 | Adams | Mar. 9, 1937 |
| 2,257,406 | Von Burtenbach | Sept. 30, 1941 |

FOREIGN PATENTS

| 251,789 | Italy | Feb. 2, 1927 |